United States Patent Office 2,905,159
Patented Sept. 22, 1959

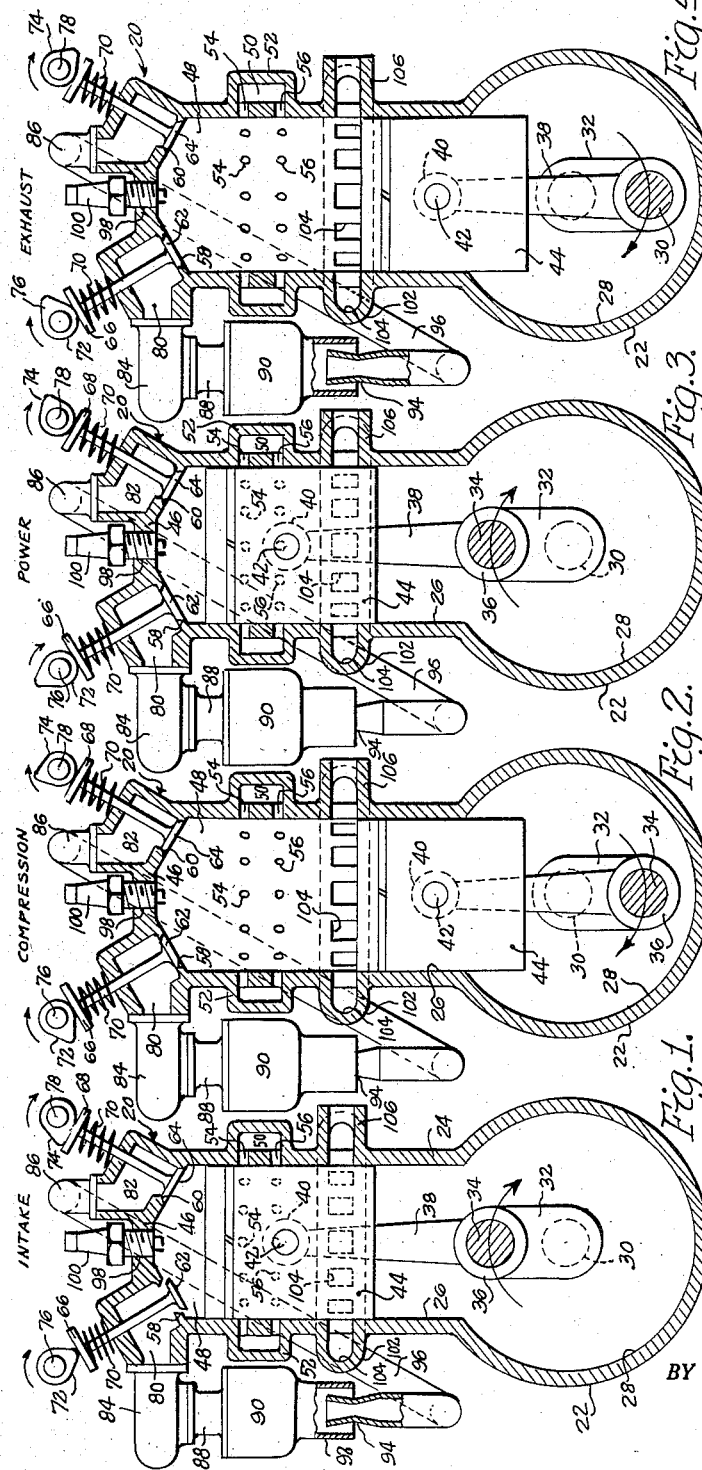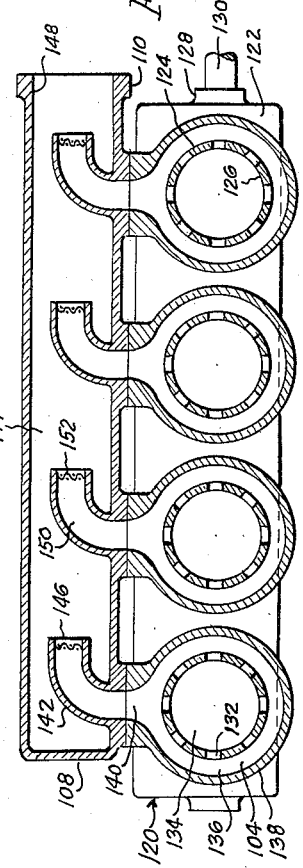

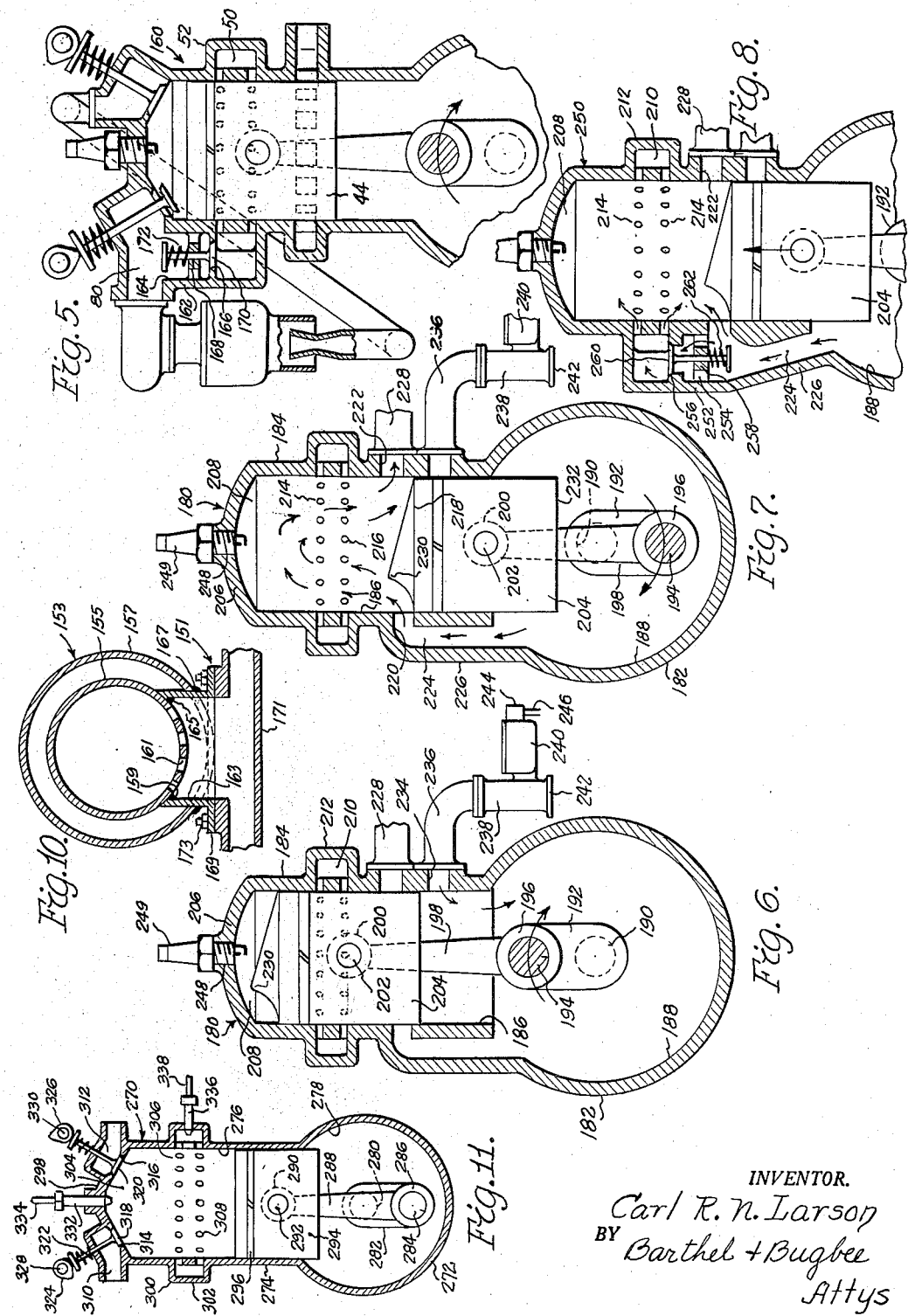

2,905,159

INTERNAL COMBUSTION ENGINE

Carl R. N. Larson, Detroit, Mich.

Application December 10, 1956, Serial No. 627,314

2 Claims. (Cl. 123—75)

This invention relates to internal combustion engines.

One object of this invention is to provide an internal combustion engine wherein an additional auxiliary combustion chamber is provided in the cylinder intermediate the top and bottom of the main combustion chamber so that an additional booster explosion occurs in the auxiliary combustion chamber at approximately mid-stroke, whereby to develop increased power during each power stroke of the engine, as well as to enable the efficient use of a longer stroke than is at present considered desirable.

Another object is to provide an internal combustion engine of the forgoing character wherein the auxiliary combustion chamber is applicable either to a two-cycle or four-cycle spark-ignited engine or to a so-called diesel or compression ignited engine, the auxiliary combustion chamber being optionally provided with liquid fuel injection, preferably timed for injection later than that in the cylinder head.

Another object is to provide an internal combustion engine of the foregoing character wherein means is additionally provided for supplying carbureted fuel gas to the auxiliary combustion chamber by a separate passageway opening thereto rather than by depending upon the suction caused by the descent of the piston during the intake stroke to supply fuel gas to the auxiliary combustion chamber.

Another object is to provide an internal combustion engine of the foregoing character which is of the carbureted two-cycle type wherein crankcase compression is relied upon to deliver a portion of the fuel gas through a check-valve-controlled passageway into the auxiliary combustion chamber, thereby insuring that the combustion chamber will receive an adequate supply of fuel gas independently of the fuel gas being compressed by the upwardly moving piston in the main combustion chamber during the compression stroke.

Another object is to provide an internal combustion engine of the foregoing character wherein the auxiliary combustion chamber is in the form of an annular chamber encircling the main combustion chamber intermediate the top and bottom thereof and having ports opening into the main combustion chamber at such intermediate locations therein.

Another object is to provide an internal combustion engine of the four-cycle type wherein the major part of the burnt gases is exhausted at the bottom of the piston stroke through a suitable port or ports located at that level, and the remaining part if exhausted through a timed exhaust valve in the cylinder head at the top of the exhaust stroke of the piston, thereby reducing the heat and pressure to which the exhaust valve would otherwise be subjected, consequently reducing the heat imparted to the cylinder head by the burnt gases being exhausted through the exhaust valve, thereby providing a more efficient cooling of the cylinder, either by liquid or by air cooling because of the lower temperatures involved, and resulting in much less deterioration of the exhaust valve and the exhaust valve seat because of the cooler condition thereof than in prior engines, with longer life to the valve and with the possibility of using rotary valves because of the cooler exhaust temperatures prevailing than in prior engines.

Another object is to provide an internal combustion engine of the four-cycle type, as set forth in the object immediately preceding wherein the division of the exhaust between the lower and upper exhaust ports reduces the noise of the exhaust in comparison with prior engines, enables the production of a full power stroke as contrasted with the only partial power stroke before exhaust as in many present engines, thereby developing more power and obtaining more complete combustion than in such present engines.

Another object is to provide an internal combustion engine of the four-cycle type, as set forth in the two preceding objects wherein a sharper timing of the valves can be obtained because the exhaust valve can be opened at a later point in the cycle than at present in prior engines, and wherein a higher efficiency is consequently obtained in a high speed engine.

Another object is to provide an internal combustion engine of the four-cycle type as set forth in the three preceding objects, wherein the division of the exhaust between lower and upper ports enables a smaller exhaust valve to be used since it is needed only to exhaust the residue of the burnt gases remaining after exhaust through the lower ports, with the result that a proportionately larger intake valve can be provided and consequently more power and efficiency developed than in prior four-cycle engines.

Another object is to provide an internal combustion engine of the four-cycle type, as set forth in the four preceding objects wherein the lower exhaust ports are arranged in an arcuate or annular path either partially or wholly encircling the cylinder at the bottom of the piston stroke, thereby still further increasing the exhaust outlet area and consequently increasing the efficiency of discharge of the exhaust gases.

Another object is to provide an internal combustion engine of the four-cycle type, as set forth in the object immediately preceding, wherein an adapter enables the conversion of a conventional four-cycle engine to a four-cycle engine according to the present invention.

Another object is to provide an internal combustion engine of the four-cycle type according to the foregoing objects wherein any unburnt gases remaining at the top of the exhaust stroke are bypassed into the carburetor intake to be returned to the cylinder along with fresh fuel gas, with a consequent resulting increase in economy and efficiency.

Another object is to provide a multi-cylinder internal combustion engine of the foregoing four-cycle type wherein means is provided in the exhaust manifold of the lower exhaust ports to prevent pre-ignition of intake fuel gas in one cylinder by the flame from the exhaust gases discharging from another cylinder.

Another object is to provide an internal combustion engine of the four-cycle type according to the preceding objects, wherein the lower exhaust ports comprise elongated holes extending upward from approximately the bottom of the stroke of the piston, the height of the holes depending upon the type of fuel used and the speed of the engine, the tops of the holes being aligned approximately with the top of the piston at approximately the beginning of the so-called rock time of the crankshaft as the crank nears the bottom of the piston stroke, the holes being heightened for higher speed engines and lowered for low speed engines.

Other objects and advantages of the invention will become apparent during the course of the following description of the accompanying drawings, wherein:

Figures 1 to 4 inclusive are diagrammatic central vertical sections through a four-cycle internal combustion engine according to one form of the present invention showing the positions of the parts during the intake, compression, power and exhaust strokes respectively, the cylinder-cooling means being omitted for simplification of showing;

Figure 5 is a diagrammatic central vertical section through a slightly modified four-cycle engine according to the present invention, showing additional means for scavenging and supplying fuel gas to the intermediate auxiliary combustion chamber;

Figures 6 and 7 are diagrammatic central vertical sections through a two-cycle internal combustion engine according to another form of the present invention, showing the positions of the parts at the top and bottom of the power stroke respectively;

Figure 8 is a view similar to Figure 7 but showing a slight modification providing additional scavenging and fuel gas supplying to the intermediate auxiliary combustion chamber;

Figure 9 is a horizontal section through the median plane of the annular exhaust port belt according to the invention as applied to a multi-cylinder engine, showing means for preventing preignition of the fuel in one cylinder by the flare-back from the exhaust from another cylinder;

Figure 10 is a horizontal section through the median plane of an arcuate exhaust port array showing an adapter employed for converting a conventional liquid-cooled four-cycle engine into one according to the present invention; and Figure 11 is a diagrammatic central vertical section through a diesel engine equipped with an intermediate auxiliary combustion chamber according to another form of the present invention.

*Four-cycle engine with auxiliary combustion chamber and divided exhaust*

Referring to the drawings in detail, Figures 1 to 4 inclusive show diagrammatically a four-cycle internal combustion engine, generally designated 20, according to one form of the invention, the cylinder cooling arrangement, whether liquid-cooled or air-cooled, and the details of the cam shaft rotating mechanisms being conventional and therefore omitted to simplify the showing and avoid detracting from the emphasis upon the invention. The four-cycle internal combustion engine 20 is also shown for the same reason of simplification, as a single-cylinder engine, it being of course understood that a multi-cylinder engine would be the ordinary form of engine to which the invention would be applied. Figure 9, however, shows the auxiliary combustion chamber feature of the invention as applied to a multi-cylinder engine, as described in more detail below. The engine 20 is also shown with the cylinder and cylinder head integral with a single piece crankcase, whereas in practice the cylinder head would be detachable and the crankcase would ordinarily be divided horizontally with an attachable pan or sump in order to provide access to the mechanism therein and enable removal of the parts thereof. Such cooling arrangements and mechanisms are conventional and their details are beyond the scope of the present invention.

The four-cycle internal combustion engine 20 is provided with a crankcase 22 and above it a cylinder 24 having a cylinder bore 26 communicating with the crank chamber 28 in the crankcase 22. The latter is conventional bearings (not shown) rotatably supports a conventional crankshaft 30 having a crank 32 with a crank pin 34 engaged by the crank pin bearing 36 of a piston rod 38, the upper end portion 40 of which is rockably connected by a wrist pin 42 to a piston 44 with the usual piston rings 45 (only one of which is shown) for simplification purposes. The piston 44 is reciprocably mounted in the cylinder bore 26, the upper portion of which beneath the cylinder head 46 constitutes a main combustion chamber 48 above the piston 44. In addition to the main combustion chamber 48, there is also provided, according to the invention, an auxiliary combustion chamber 50 located approximately at midstroke of the piston 44 and formed by an annular hollow casing 52 encircling the cylinder 24. The auxiliary combustion chamber 50 is connected to the main combustion chamber 48 by upper and lower multiple ports 54 and 56 respectively. This auxiliary combustion chamber 50 serves as a booster combustion chamber imparting an additional downward thrust to the piston 44 by an additional explosion therein at approximately midstroke of the piston 44, as explained below in connection with the operation of the invention.

The cylinder head 46 is provided with intake and exhaust valve seats 58 and 60 respectively served by poppet valves 62 and 64 respectively having lifter heads or enlargements 66 and 68 engaged by compression springs 70 for normally urging the intake and exhaust valves 62 and 64 into engagement with their respective seats 58 and 60. Intake and exhaust cams 72 and 74 on intake and exhaust cam shafts 76 and 78 connected by suitable conventional mechanism to the crankshaft 30 open and close the intake and exhaust valves 62 and 64 in timed relationship therewith. The intake and exhaust valves 62 and 64 open into intake and exhaust chambers 80 and 82 respectively to which in turn are connected intake and exhaust manifolds 84 and 86 respectively.

Connected to the intake manifold 84 is the outlet 88 of a conventional carburetor 90, the air intake 92 of which is provided with a venturi nozzle 94 connected by a transfer conduit 96 to the exhaust manifold 86 for the purpose of bypassing unburnt exhaust gases into the carburetor air intake 92, as explained below in connection with the operation of the invention. The cylinder head 46 intermediate the valve seats 58 and 60 is bored and threaded as at 98 to receive a conventional spark plug 100 which in turn is electrically connected by way of a conventional timer to the secondary of an ignition spark coil, the primary of which is electrically connected through a conventional distributor to a conventional storage battery. The details of such ignition systems are conventional and well known to automotive engineers and are beyond the scope of the present invention.

The cylinder 24 at approximately the bottom of the stroke of the piston 44 is provided with an annular exhaust casing 102 containing an annular lower exhaust chamber 104 connected to the lower end of the combustion chamber 48 by circumferentially-spaced multiple exhaust ports 104. The exhaust casing 102 is provided with an outlet duct 106 to which a lower exhaust manifold 108 (Figure 9) is connected. The lower exhaust manifold 108 is in turn provided with a flange 110 for the connection of the usual exhaust pipe (not show) leading to the conventional muffler and tail pipe. As stated above, the invention is adapted to be applied and would be applied most frequently to a multi-cylinder engine rather than to the single cylinder engine 20 shown for simplicity in Figures 1 to 4 inclusive, and the multi-cylinder engine, generally designated 120, shown in Figure 9 illustrates such an adaptation. Here, again, the cooling system is omitted for simplicity of showing and the horizontal section shown is taken in the median horizontal plane through the annular lower exhaust chamber 104. The engine 120 has a crankcase 122 from which rise cylinders 124 with cylinder bores 126, the crankcase 122 being provided with bearings 128 rotatably supporting a crankshaft 130.

Each cylinder 124 (Figure 9) of the multi-cylinder engine 120 is provided with lower exhaust ports 132 opening from the main combustion chambers 134 thereof into lower combustion chambers 136 formed in annular lower exhaust casings 138 having exhaust outlet ports 140 leading therefrom into the exhaust manifold 108. The latter is provided with elbow ducts 142 communicating with the exhaust outlet ports 140 and extending into the exhaust manifold chamber 144 with the outlets 146 disposed in the direction of the exhaust manifold outlet 148 at the flange 110. The elbow ducts 142 contain elbow passageways 150 at the outlets 146 of which are mounted metallic screens or netting 152. The latter prevent backward propagation of flame from an elbow duct 142 which is at that instant discharging flame into another elbow duct passageway 150 which is at that instant on its intake stroke. The elbow form of the ducts 142 also serves to further reduce the possibility of flare-back and pre-ignition in this manner because the exhaust flames from other cylinders would normally be deflected past the outlets 146 even if unprotected by the screens 152.

The slightly modified four-cycle internal combustion engine, generally designated 160, shown in Figure 5 is for the most part similar in construction to the engine 20 shown in Figures 1 to 4 inclusive, and similar parts are accordingly designated with the same reference numerals.

The modified engine 160, however, differs from the engine 20 by providing a valve casing 162 extending from a port 164 in the intake chamber 80 to a combined port and valve seat 166 opening into the upper side of the annular hollow casing 52 so as to provide communication between the intake chamber 80 and the auxiliary combustion chamber 50. In order to permit communication between these chambers in one direction only, the valve casing 162 is provided with a spider 168 bored centrally to reciprocably receive the stem of a check valve 170 of the poppet type, the head of which normally closes the combined port and valve seat 166 in response to the upward urge provided by the compression spring 172 which acts between the spider 168 and the enlarged upper end of the stem of the check valve 170.

In the operation of the four-cycle internal combustion engine 20 of Figures 1 to 4 inclusive, let it be assumed that the piston 44 is at the top of its intake stroke with the intake valve 62 open (Figure 1), and that the carburetor 90 is supplied with hydrocarbon fuel, such as gasoline. The carburetor 90 vaporizes this fuel while mixing it with air in the proper proportions, as is well understood by automotive engineers, the fuel gas mixture being discharged through the carburetor outlet 88 into the intake manifold 84 in response to the suction created by the descent of the piston 44 from the position shown in Figure 1 to that of Figure 2, thereby filling the combustion chamber 48 of the cylinder 24 with the fuel gas mixture. At the same time, a portion of the fuel gas mixture is drawn through the ports 54 into the auxiliary combustion chamber 50 by the suction of the descending pistons 44 inserted through the lower ports 56, filling the auxiliary combustion chamber 50. As the crank 32 passes over dead center (Figure 2) and the piston 44 rises in the cylinder bore 26, it compresses this fuel gas mixture, both in the main combustion chamber 48 and the auxiliary combustion chamber 52, the intake valve 62 having meanwhile been closed by the rotation of its cam 72 (Figure 2).

The piston 44 continues upward on its compression stroke until it again reaches the top of its stroke (Figure 3), whereupon the ignition system of the engine causes a spark to jump between the electrodes of the spark plug 100, igniting the compressed fuel gas mixture in the main compression chamber 48. The resulting explosion drives the piston 44 downward upon its power or explosion stroke (Figure 3). As the piston 44 passes the ports 54 leading into the auxiliary combustion chamber 50, the flame passing from the main combustion chamber 48 into the auxiliary combustion chamber 50 ignites the fuel gas mixture in the latter. The resulting explosion causes additional exhaust gases to pass outward into the main combustion chamber 48 from the auxiliary combustion chamber 50, thereby imparting an additional thrust to the descending piston 44 at approximately mid-stroke, and thus providing a booster effect which increases the power and smooths out the explosion cycle.

When the piston 44 has descended to the bottom of its stroke (Figure 4) during its power or explosion stroke, it uncovers the ports 104 in the annular exhaust casing 102, permitting the exhaust gases to pass through the annular lower exhaust chamber 104 and outlet duct 106 into the exhaust manifold, such as the exhaust manifold 108 shown in Figure 9. As the crank 32 again crosses its lower dead center and starts to ascend, the exhaust valve cam 74 opens the exhaust valve 64 (Figure 4) so that the ascending piston 44 forces the remaining exhaust gases upward through the exhaust ports 160 into the exhaust manifold 86. As this residue usually contains unburnt fuel gas, the residue is forced by the ascent of the piston 44 through the now open exhaust valve port 60, the exhaust chamber 82, exhaust manifold 86, transfer conduit 96 and venturi nozzle 94 into the air intake 92 of the carburetor 90, where it mixes with the incoming air and is conducted with newly-carbureted fuel gas back to the main combustion chamber 48 through the intake valve port 58 (Figure 1) as the intake valve 62 again opens and the piston 44 again descends upon its intake stroke.

The operation of the modified four-cycle engine 160 shown in Figure 5 is similar to that of the engine 20 of Figures 1 to 4 inclusive, except that during the intake stroke and consequent descent of the piston 44, the suction created in the auxiliary combustion chamber 50 overcomes the upward thrust of the valve spring 172 against the check valve 170, pulling the latter downward and drawing fuel gas directly from the intake chamber 80 through the valve casing 162 into the auxiliary combustion chamber 50. The valve 170 closes during the compression and explosion or power strokes of the platen 44 so that the action in other respects is similar to that described above in connection with the operation of the engine 20 of Figures 1 to 4 inclusive. In either engine, the division of the exhaust between the lower exhaust ports 104 and annular exhaust casing 102 and the upper exhaust chamber 82 and port 60 causes the bulk of the heat to be ejected through the lower annular exhaust casing 102. This action relieves the intake and exhaust valves 62 and 64 and their seats or ports 58 and 60 of much of the heat damage sustained by them in conventional engines, and also keeps the cylinder head 46 much cooler than the cylinder heads of conventional engines. The result is that the cylinder head 46 is subject to much less differential expansion than in conventional engines, and cooling of the cylinder 24 and its head 46 is greatly facilitated.

The adapter 151 shown in Figure 10 enables the conversion of a conventional four-cycle engine to a four-cycle engine with divided exhaust according to the invention, and generally designated 153. In its original form before conversion, the engine 153 had a cylinder wall 155 encircled by a water jacket wall 157. The adapter 151 has a horizontally-elongated mouth 159 in vertical cross-section, the mouth 159 being of sufficient width to cover an arcuate row of exhaust ports 161 which the mechanic or other workman drills or otherwise forms in the cylinder wall 155, and of sufficient height to cover the height of the ports, in much the same manner as the annular casing 102 covers the row of ports 104 in the engine 20 of Figures 1 to 4 inclusive. The mechanic also cuts a horizontally-elongated hole 163 in the water jacket wall 157 immediately opposite the arcuate row of ports 161 of a size sufficient to snugly receive the adapter 151. The mechanic then inserts the adapter 151 in the hole 163, and welds or otherwise secures it as at 165 and 167 to the cylinder wall 155 and water jacket wall 157 respectively, to provide water-tight connections therebetween. The adapter 151 has an outer marginal flange 169 to which an exhaust manifold 171 may be attached, as by the bolts 173.

The operation of the converted four-cycle engine 153 is similar to that of the engine 20 of Figures 1 to 4 inclusive, with the major part of the exhaust gases discharged through the lower exhaust ports 161 and the remainder through the conventional valves in or near the cylinder head. The advantages of the converted engine 153 are also similar to those described above for the engine 20, and hence require no repetition.

In addition to the advantages stated above for the construction, according to the present invention, effecting division of the exhaust between lower ports and upper valves, the further advantage is obtained of enabling the use of rotary valves in place of poppet valves in the cylinder head. Such rotary valves are ordinarily disadvantageous because of their sensitivity to the excessive heat of the exhaust gases, where all of these gases are exhausted through the cylinder head, which consequently becomes very hot. The present invention by discharging the major portion of the exhaust gases through the lower ports reduces the temperatures in the vicinity of the cylinder head so as to make the use of rotary valves therein both feasible and advantageous.

*Two-cycle engine with auxiliary combustion chamber*

The two-cycle engine, generally designated 180, shown in Figures 6 and 7 has a crankcase 182 and cylinder 184 rising therefrom and containing a cylinder bore 186 opening into the crank chamber 188. As in the case of the engine 20, the usual cooling jacket or fins and the usual detachable crankcase pan are omitted to simplify the drawings. Rotatably mounted in the crankcase 182 by conventional bearings (not shown) is a crankshaft 190 having a crank 192 with a crankpin 194 engaging the lower end bearing 196 of a connecting rod 198, the upper end 200 of which is connected by a wrist pin 202 to a piston 204. The cylinder head 206, for convenience shown integral with the cylinder 184 but in practice detachable therefrom, closes the upper end of the cylinder bore 186 and with it forms the main combustion chamber 208. Approximately halfway down the cylinder 184 is placed an annular hollow casing 212 enclosing an auxiliary combustion chamber 210 communicating with the main combustion chamber 208 through upper and lower multiple ports 214 and 216 respectively. Immediately adjacent the top edge 218 of the piston 204 at the bottom of its stroke (Figure 7), the cylinder 184 is provided on diametrically opposite sides with intake and exhaust ports 220 and 222 respectively. The exhaust port 220 is connected to the crank chamber 188 by means of a passageway 224 located in a hollow elongated boss 226, whereas an exhaust manifold is connected at one end to the exhaust port 222 and at its opposite end to a conventional muffler and tail pipe (not shown).

As is customary in two-cycle engines, the top 218 of the piston 204 is provided with a wave-shaped baffle 230 separating the intake port 220 from the exhaust port 222 and deflecting the incoming fuel gas from the outgoing exhaust gases, as indicated by the arrows in Figure 7. The cylinder 184, beneath the level of the intake and exhaust ports 220 and 222 at approximately the level of the bottom 232 of the piston 204 (Figure 6), is provided with a crankcase intake port 234 connected by an intake manifold 236 to the outlet 238 of a conventional carburetor 240 having an air intake 242 and a liquid fuel intake 244 supplied with liquid hydrocarbon fuel through a pipe 246 in the usual way (Figure 6). The cylinder head 206 is bored and threaded as at 248 to receive the correspondingly-threaded spark plug 249 which is connected to a conventional ignition system of the usual character.

The slightly modified two-cycle internal combustion engine, generally designated 250, of Figure 8 is similar in general to the two-cycle engine 180 of Figures 6 and 7 and similar parts are designated with the same reference numerals. In the modified two-cycle engine 250, however, th upper end of the elongated hollow boss 226 is connected to the lower side of the annular hollow casing 212 by a valve casing 252 extending from a port 254 at the upper end of the intake passageway 224 to a combined port and valve seat 256 opening into the lower side of the annular hollow casing 212 so as to provide communication betwen the intake passageway 224 and the auxiliary combustion chamber 210. In order to permit communication between these chambers in one direction only, the valve casing 252 is provided at the port 254 with a spider 258 bored centrally to reciprocably receive the stem of a check valve 260 of the poppet type, the head of which normally closes the combind port and valve seat 256 in response to the downward thrust of the compression spring 262 which acts between the spider 258 and the enlarged lower end of the stem of the check valve 260.

In the operation of the two-cycle engine 180 of Figures 6 and 7, let it be assumed that a charge of fuel gas has been received and compressed in the main combustion chamber 208 by the ascent of the piston 204 to the top of its stroke (Figure 6), and that a spark has been caused to jump across the electrodes of the spark plugs 249 by the conventional electrical ignition system connected thereto. The resulting ignition of the compressed fuel gas and air mixture in the main combustion chamber 208 drives the piston 204 downward upon its power stroke. At approximately mid-stroke in its descent, the piston 204 uncovers the upper ports 214 leading from the main combustion chamber 208 to the auxiliary combustion chamber 210, the flame from the former igniting the fuel gas mixture in the latter. The resulting explosion in the auxiliary combustion chamber 210 imparts an additional thrust to the descending piston 204 at approximately its mid-stroke, smoothing out its explosion stroke and imparting additional power to the crankshaft 190.

When the descending piston 204 reaches the bottom of its stroke (Figure 7), the baffle 230 on its top 218 first uncovers the exhaust port 222 to permit discharge of the burnt gases, and immediately thereafter uncovers the intake port 220. Meanwhile, the descent of the piston 204 has caused compression of the fuel gas and air mixture in the crank chamber 108 and the uncovering of the intake port 220 causes this fuel gas mixture to pass upward through the passageway 224 and the intake port 220 into the lower end of the combustion chamber 208, assisting in scavenging the burnt gases from the power stroke, as indicated by the arrows in Figure 7. The crank 192 then passes over lower dead center and rises, cutting off the intake and exhaust ports 220 and 222 and compressing the fuel and air gas mixture in the main combustion chamber 208 and at the same time filling the auxiliary combustion chamber 210. The continuing ascent of the piston 204 causes its lower edge or bottom 232 to uncover the crankcase intake port 234 (Figure 6), the suction thereby created in the crank chamber 188 drawing in a charge of carbureted fuel gas through the intake manifold 236 and crankcase intake port 234 as indicated by the arrows in Figure 6. The cycle then repeats itself in the manner described above.

The operation of the modified two-cycle engine 250 is substantially the same as that described above, except that during the operation, the compression of the carbureted fuel gas mixture in the crankcase chamber 188 overcomes the thrust of the check valve spring 262 and raises the check valve 260, permitting fuel gas to pass directly from the passageway 224 through the ports 254 and 256 into the auxiliary combustion chamber 210, where it is exploded in the manner described immediately above by flames entering the ports 214 from the main combustion chamber 208. The operation is otherwise the same as that of the engine 180 described above.

Diesel engine with auxiliary combustion chamber

The further modified engine, generally designated 270, shown in Figure 11 is a Diesel type engine wherein the liquid fuel is injected into the combustion chamber at the top of the compression stroke in which only air is compressed, ignition taking place by the heat developed during compression of the air, in accordance with the laws of thermodynamics applying to the compression of gases. The diesel engine 270, shown diagrammatically without separable parts and without cooling means in order to simplify the disclosure, has a crankcase 272 from which rises a cylinder 274 having a cylinder bore 276 opening into the crank chamber 278. A crankshaft 280 is journaled in conventional bearings (not shown) in the crankcase 272 in the usual way and has a crank 282 with a crank pin 284 engaged by the crank pin bearing 286 on the lower end of a connecting rod 288. The upper end 290 of the connecting rod 288 encircles a wrist pin 292 upon which a piston 294 is rockably mounted. The piston 294 is reciprocable in the cylinder bore 276 and carries the usual piston rings 296, only one of which is shown for purposes of simplification.

The cylinder 274 is provided with the usual cylinder head 298 and, approximately midway between the cylinder head 298 and the top of the crankcase 272, is encircled by an annular hollow casing 300 containing an auxiliary combustion chamber 302 located outside of and below the main combustion chamber 304 at the upper end of the cylinder bore 276 beneath the cylinder head 298. The main combustion chamber 304 communicates with the auxiliary combustion chamber 302 through upper and lower circumferentially-spaced multiple ports 306 and 308 respectively.

The cylinder head 298 contains intake and exhaust chambers 310 and 312 communicating with the main combustion chamber 304 through intake and exhaust ports or valve seats 314 and 316 controlled by intake and exhaust valves 318 and 320 respectively. The heads of the valves 318 and 320 are urged against their respective seats 314 and 316 by valve springs 322 acting between the cylinder head 298 and the enlarged upper ends of the stems of the valves 318 and 320, these in turn being engaged by intake and exhaust cams 324 and 326 on intake and exhaust cam shafts 328 and 330 respectively. The intake and exhaust cam shafts 328 and 330 are driven in timed relationship with the crankshaft 280 by conventional cam shaft driving mechanism well known to engineers in the internal combustion engine field and hence requiring no description here.

As previously stated, the Diesel engine 270 compresses a change or air only, liquid fuel being injected into the main combustion chamber 298 at the top of the stroke. This injection in the Diesel engine 270 is accomplished by the main fuel injection nozzle 332 located in the cylinder head 298 and connected by a pipe 334 to a conventional liquid fuel injector which, as is well known to diesel engine engineers, is a type of precision high pressure pump driven in timed relationship with the crankshaft 280 through conventional mechanism. In order to supply fuel to the auxiliary combustion chamber 302, an auxiliary liquid fuel injection nozzle 336 is mounted in the annular hollow casing 300 and is also connected by a pipe 338 to a conventional liquid fuel injector, similarly driven by conventional timing mechanism from the crankshaft 280 and preferably timed to inject the liquid fuel charge into the auxiliary combustion chamber 302 slightly later than the injection of the main fuel charge through the main fuel injection nozzle 332 into the main combustion chamber 298.

The operation of the diesel engine 270 with auxiliary combustion chamber, according to the invention, has already been largely indicated above in the description of the mechanism. Let it be assumed, as in Figure 11, that the intake valve 318 has just closed after being held open by its cam 324 long enough for a charge of air to be drawn through the intake chamber 310 of the cylinder head 298 into the main combustion chamber 304 as the piston 294 has descended to its lowest position in response to the rotation of the crankshaft 280. Continued rotation of the crankshaft 280 and the consequent rise of the piston 294 in the cylinder bore 276 compresses the air in the main combustion chamber 298, the temperature of the compressed air charge rising as the piston 294 near the top of its stroke, in accordance with the laws of thermodynamics applicable to the compression of gases. When the piston 294 reaches approximately the top of its stroke, the fuel injector (not shown) injects a charge of liquid fuel through the main fuel injection nozzle 332 into the main combustion chamber 298 and slightly later, a charge of liquid fuel is injected through the auxiliary fuel injection nozzle 336 into the auxiliary combustion chamber 302. The heat of compression in the main combustion chamber 304 immediately ignites the mixture of compressed air and liquid hydrocarbon fuel, commonly known as diesel oil. The resulting combustion forces the piston 294 downward upon its power stroke until it uncovers the upper auxiliary combustion chamber ports 306, whereupon the propagation of flame through the ports 306 ignites the fuel and compressed air mixture in the auxiliary combustion chamber 302. The resulting combustion in the latter chamber 302 discharges exploding gas through the ports 306 and 308 into the main combustion chamber 304 and imparts a booster thrust to the piston 294 at approximately mid-stroke. This booster thrust increases the power of the power stroke and smooths it out.

As the four-cycle engine 20 and two-cycle engine 180 employ the same or similar adaptation of the auxiliary combustion chamber in a hollow annular casing located on the cylinder at approximately mid-stroke of the piston, so it will also be apparent that a two-cycle diesel engine employing ports uncovered by the piston instead of valves as in Figure 11 may also incorporate the auxiliary combustion casing 300 and chamber 302, as shown in Figure 11. This is done in a manner analogous to the relationship of the two-cycle gasoline engine 180 of Figures 6 and 7 and the four-cycle gasoline engine 20 of Figures 1 to 4 inclusive.

From Figures 1 to 5 inclusive it will be evident that the transfer conduit 96 may be omitted and the exhaust manifold 86 connected to the muffler in the usual way, the transfer conduit 96 being an optional but not essential feature of the invention. It will also be evident from these same figures that the annular casing 52 with its auxiliary combustion chamber 50 and ports 54 and 56 may also be omitted as these are also not an essential feature of the invention, the engine 20 or 160 of Figures 1 to 4 and 5 respectively being completely operable without the auxiliary combustion chamber casing 50 and its accompanying ports 54 and 56.

It will also be evident that the terms "upper" and "lower" are purely relative in referring to an upright engine, and that they would become respectively "outer" and "inner" in a horizontal or horizontal-opposed engine and the opposite in an inverted engine or in the lower cylinders of a radial engine.

What I claim is:

1. An internal combustion engine comprising a cylinder having a cylinder bore with a combustion chamber in one end thereof having main intake and exhaust ports therein, intake and exhaust valves disposed respectively in said intake and exhaust ports, a piston reciprocable in said bore, a rotary shaft, motion-converting mechanism connected between said piston and shaft and responsive to the reciprocation of said piston to rotate said shaft, means for opening and closing said valves in timed relationship with the rotation of said shaft, a supplemental exhaust chamber disposed adjacent said cylinder at substantially the bottom of the stroke of said piston, a supplemental exhaust port disposed in said cylinder at substantially the bottom of the stroke of said piston and extending from said bore into said chamber, said supplemental exhaust port being adapted to be uncovered by said piston at the lower limit of its reciprocation, a carburetor having a gaseous fuel outlet connected to said intake port and having an air inlet, and a gas transfer conduit extending from said main exhaust port to said air inlet, said valve opening and closing means being constructed and arranged to open said main exhaust valve subsequent to the uncovering of said supplemental exhaust port by said piston whereby to supply only residual unburned exhaust gas through said gas transfer conduit to said carburetor after the previous discharge of exhaust gas through said supplemental port previously uncovered by said piston.

2. An internal combustion engine comprising a cylinder having a cylinder bore with a combustion chamber in one end thereof having main intake and exhaust ports therein, intake and exhaust valves disposed respectively in said intake and exhaust ports, a piston reciprocable in said bore, a rotary shaft, motion-converting mechanism connected between said piston and shaft and responsive to the reciprocation of said piston to rotate said shaft, means for opening and closing said valves in timed relationship with the rotation of said shaft, a supplemental exhaust chamber disposed adjacent said cylinder at substantially the bottom of the stroke of said piston, a supplemental exhaust port disposed in said cylinder at substantially the bottom of the stroke of said piston and extending from said bore into said chamber, said supplemental exhaust port being adapted to be uncovered by said piston at the lower limit of its reciprocation, a carburetor having a gaseous fuel outlet connected to said intake port and having an air inlet, and a gas transfer conduit extending from said main exhaust port to said air inlet, said conduit having a venturi nozzle thereon discharging into said air inlet, said valve opening and closing means being constructed and arranged to open said main exhaust valve subsequent to the uncovering of said supplemental exhaust port by said piston whereby to supply only residual unburned exhaust gas through said gas transfer conduit to said carburetor after the previous discharge of exhaust gas through said supplemental port previously uncovered by said piston.

References Cited in the file of this patent
UNITED STATES PATENTS

| | | |
|---|---|---|
| 879,763 | Gergler | Feb. 18, 1908 |
| 906,345 | Williams | Dec. 8, 1908 |
| 1,052,340 | Holst | Feb. 4, 1913 |
| 1,101,332 | Roberts | June 23, 1914 |
| 1,357,152 | Davidson | Oct. 26, 1920 |
| 1,377,535 | White | May 10, 1921 |
| 1,384,133 | Howe | July 12, 1921 |
| 1,585,377 | Cromwell | May 18, 1926 |
| 2,239,262 | Violet | Apr. 22, 1941 |

FOREIGN PATENTS

| | | |
|---|---|---|
| 271,212 | Italy | Feb. 1, 1930 |
| 828,228 | France | Feb. 7, 1938 |